(12) United States Patent
Kumar et al.

(10) Patent No.: US 12,105,599 B2
(45) Date of Patent: *Oct. 1, 2024

(54) MITIGATING AND AUTOMATING BACKUP FAILURE RECOVERIES IN DATA PROTECTION POLICIES

(71) Applicant: EMC IP Holding Company LLC, Hopkinton, MA (US)

(72) Inventors: Pravin Ashok Kumar, Bangalore (IN); Wei Wang, Chengdu (CN)

(73) Assignee: EMC IP Holding Company LLC, Hopkinton, MA (US)

(*) Notice: Subject to any disclaimer, the term of this patent is extended or adjusted under 35 U.S.C. 154(b) by 243 days.

This patent is subject to a terminal disclaimer.

(21) Appl. No.: 17/739,001

(22) Filed: May 6, 2022

(65) Prior Publication Data

US 2022/0276935 A1    Sep. 1, 2022

Related U.S. Application Data

(63) Continuation of application No. 17/188,073, filed on Mar. 1, 2021, now Pat. No. 11,403,184.

(51) Int. Cl.
| | |
|---|---|
| G06F 11/00 | (2006.01) |
| G06F 11/07 | (2006.01) |
| G06F 11/14 | (2006.01) |

(52) U.S. Cl.
CPC ........ *G06F 11/1461* (2013.01); *G06F 11/076* (2013.01); *G06F 11/0769* (2013.01); *G06F 11/0772* (2013.01); *G06F 11/0775* (2013.01); *G06F 11/0781* (2013.01); *G06F 11/079* (2013.01); *G06F 11/143* (2013.01); *G06F 11/1458* (2013.01); *G06F 2201/81* (2013.01)

(58) Field of Classification Search
CPC .................. G06F 11/1461; G06F 11/1458
See application file for complete search history.

(56) References Cited

U.S. PATENT DOCUMENTS

| | | | |
|---|---|---|---|
| 6,704,885 B1* | 3/2004 | Salas-Meza | H04L 67/55 714/E11.124 |
| 11,403,184 B1* | 8/2022 | Kumar | G06F 11/0772 |
| 2018/0314457 A1* | 11/2018 | Bender | G06Q 10/20 |
| 2022/0276935 A1* | 9/2022 | Kumar | G06F 11/1446 |

* cited by examiner

*Primary Examiner* — Philip Guyton
(74) *Attorney, Agent, or Firm* — Staniford Tomita LLP

(57) ABSTRACT

Assets to associate to a data protection policy and configuration information for the policy is received. The configuration information includes a data protection job to perform for the assets and a schedule for the job. A shadow policy is generated including the configuration information from the data protection policy and a retry protocol. The data protection job is performed according to the schedule. A failure of the data protection job for an asset is detected. The asset is moved out of the data protection policy and into the shadow policy. The data protection job for the asset is retried according to the retry protocol in the shadow policy.

17 Claims, 10 Drawing Sheets

Enable Shadow Policy for failed assets

Calculate a base time value as a function of a threshold number of retries, a policy recurrence interval value, and a current number of retries, where the base time value increases with each unsuccessful retry
910

Add a random time value to the base time value to obtain a wait time
915

After the wait time has elapsed, retry the data protection job
920

FIG. 9

Collect and parse log files
1010

Cluster log entries in the log files based on severities recorded in the log entries and time intervals during which the log entries were recorded
1015

Report to user
1020

FIG. 10

MITIGATING AND AUTOMATING BACKUP FAILURE RECOVERIES IN DATA PROTECTION POLICIES

CROSS-REFERENCE TO RELATED APPLICATIONS

This application is a continuation of U.S. patent application Ser. No. 17/188,073, filed Mar. 1, 2021, and is incorporated herein by reference for all purposes.

TECHNICAL FIELD

The present invention relates generally to information processing systems, and more particularly to protecting data.

BACKGROUND

A typical organization may have many thousands of clients having data to protect. Such data may include numerous virtual machines, databases, filesystems, and the like. Many organizations rely on a data protection or backup system to protect against data loss. A backup system functions by performing data protection activities such as backing up and storing backup copies of an organization's data, replicating the data (e.g., storing copies of the data in multiple locations to improve resilience), and moving backup data among different storage tiers. A data protection system relies on and has many different services to perform its functions correctly. Thus, the environment within which the data protection system operates can be very complex with many interdependent components.

As such, it is not uncommon for a backup, as an example, to fail. For example, a particular virtual machine hosted by a particular client may fail to be backed up. There can be any number of reasons for the failure. For example, a software patch may not have been installed correctly, a hardware component on the client may have failed, a backup storage device at which the backup was to be stored may have failed, or a required service may have unexpectedly stopped running.

When such a failure occurs, it can be extremely laborious and time-consuming for an administrator to investigate. Conventional data protection systems lack good recovery mechanisms to help recover from a failure and assist the administrator in tracing the root cause of the failure.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF DESCRIPTION OF THE FIGURES

In the following drawings like reference numerals designate like structural elements. Although the figures depict various examples, the one or more embodiments and implementations described herein are not limited to the examples depicted in the figures.

FIG. 9 shows a flow for calculating a wait time for retrying a failed data protection job, according to one or more embodiments.

FIG. 10 shows a flow for collecting and analyzing log files, according to one or more embodiments.

DETAILED DESCRIPTION

Figure 1:
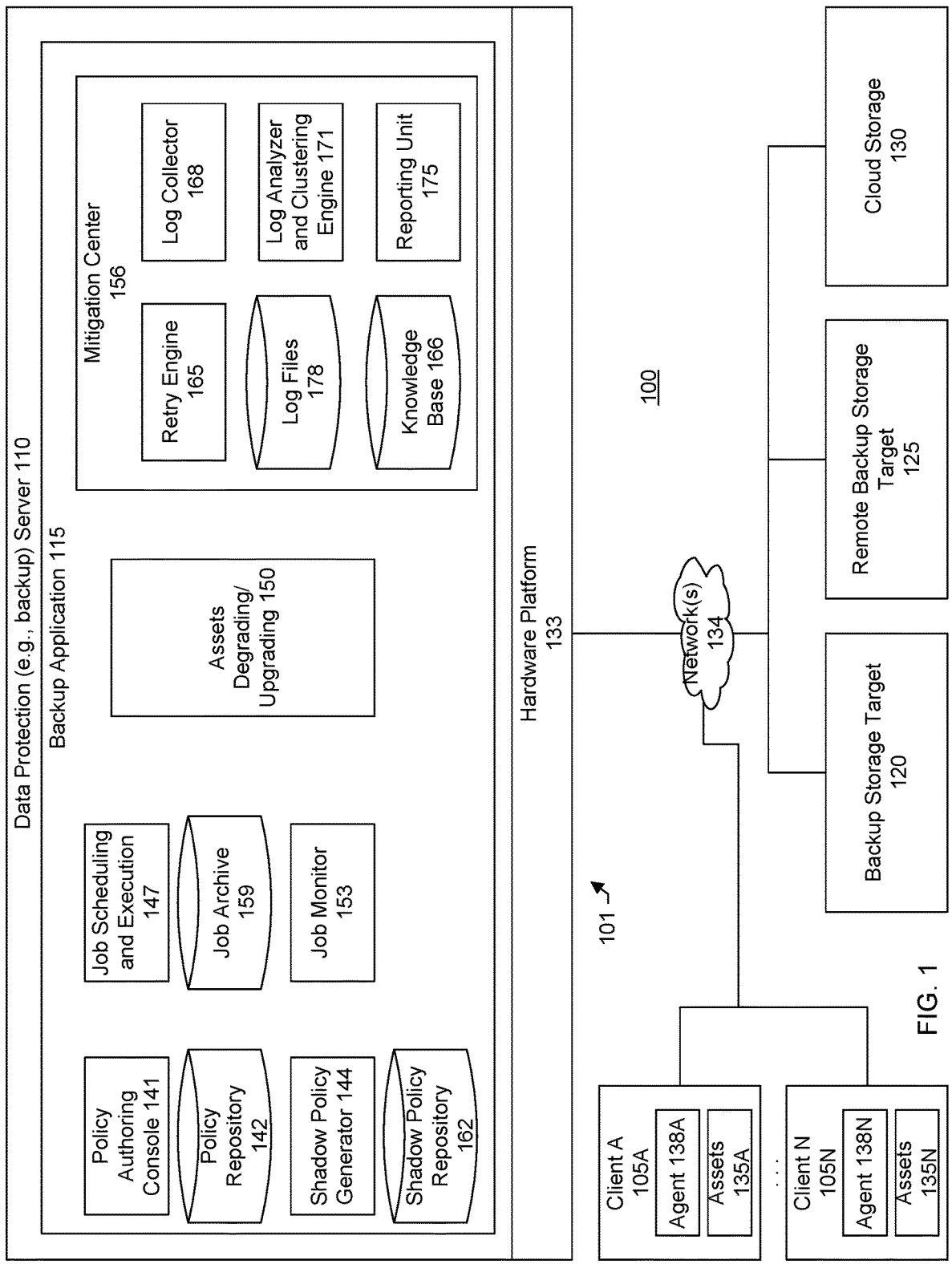
FIG. 1 shows a block diagram of an information processing system for mitigating and automating backup failure recoveries, according to one or more embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention. Aspects of the one or more embodiments described herein may be implemented on one or more computers executing software instructions, and the computers may be networked in a client-server arrangement or similar distributed computer network. In this disclosure, the variable N and other similar index variables are assumed to be arbitrary positive integers greater than or equal to two. It should be appreciated that the blocks shown in the figures may be functional and there can be many different hardware and software configurations to implement the functions described.

Disclosed herein are systems and methods for mitigating and automating data protection, such as backup, failure recoveries in connection with data protection policies. Such systems and techniques help ensure that data assets are properly protected, prevent overloading of system resources, and enhance the user experience. FIG. 1 shows a block diagram of an information processing system 100 within which such methods and systems may be implemented according to one or more embodiments.

In the example shown in FIG. 1, a customer organization has a set of clients 105A-N that are to be protected by a data protection system 101. The data protection system may be referred to as a backup system. The backup system represents any type of server or cluster of servers. The backup system may provide for on premise backup storage, remote backup storage, and cloud storage.

In particular, the backup system may include a data protection or backup server 110 having a backup application 115 to manage and control backing up, restoring, and other data protection activities, storage for the backups such as a backup target storage 120, a remote backup target storage 125, and a cloud storage 130. The backup system is supported by an underlying hardware platform 133. The hardware may include storage, memory, processors, and the like.

Backup target storage can be local or on premise site storage (e.g., local to the clients) in which backups are stored in network attached storage or storage area network of the organization. The remote backup target storage can be at a geographical location different or remote from the local site such as at a remote office or branch.

Target storage at which the backups are stored may include storage servers, clusters of storage servers, network storage devices, storage device arrays, storage subsystems including RAID (Redundant Array of Independent Disks) components, a storage area network (SAN), network attached storage (NAS), or direct attached Storage (DAS) that make use of large-scale network accessible storage devices, such as large capacity tape or drive (optical or magnetic) arrays. In an embodiment, the storage (e.g., tape or disk array) may represent any practical storage device or set of devices, such as tape libraries, virtual tape libraries (VTL), fiber-channel (FC) storage area network devices, and OST (OpenStorage) devices. The storage may include any number of storage arrays having any number of disk arrays organized into logical unit numbers (LUNs). A LUN is a number or other identifier used to identify a logical storage unit. A disk may be configured as a single LUN or may include multiple disks. A LUN may include a portion of a disk, portions of multiple disks, or multiple complete disks. There can be different tiers or types of storage. For example, recently backed up data assets may be placed in a first tier having high performance storage devices (e.g., solid state drives (SSDs)) as recently backed up data may be more likely to be accessed as compared to older backups. As backups age or frequency of access decreases, the backups may be transferred from the first tier to a second tier having lower performance, but less expensive storage devices (e.g., hard disk drives (HDDs)).

The cloud storage may be provided by a third party public cloud service provider. Some examples of cloud storage providers or public clouds include Amazon Web Services® (AWS Cloud) as provided by Amazon, Inc. of Seattle, Washington; Microsoft Azure® as provided by Microsoft Corporation of Redmond, Washington; Google Cloud® as provided Alphabet, Inc. of Mountain View, California; and others. The cloud storage provider makes resources available as services to its tenants over the network (e.g., internet). The cloud storage provider, however, is responsible for the underlying infrastructure. For example, Amazon Simple Storage Service (S3) provides storage for customer data in object storage. Data, such as files, may be stored as objects in logical containers referred to as buckets. Cloud storage can provide a cost-effective solution for long-term retention of at least a subset of the backups.

A network 134 interconnects the components and provides a mechanism for allowing the various components of the information processing system to communicate with each other. The network may itself be comprised of many interconnected computer systems and communication links. Communication links may be hardwire links, optical links, satellite or other wireless communications links, wave propagation links, or any other mechanisms for communication of information. Various communication protocols may be used to facilitate communication between the various systems shown in FIG. 1. These communication protocols may include TCP/IP, HTTP protocols, wireless application protocol (WAP), vendor-specific protocols, customized protocols, and others. While in one embodiment, the network is the Internet, in other embodiments, the network may be any suitable communication network including a local area network (LAN), a wide area network (WAN), a wireless network, an intranet, a private network, a public network, a switched network, and combinations of these, and the like.

The clients may be any type of computing device. A client may be referred to as a host. Examples of computing devices include personal computers (e.g., desktops, laptops, tablets, smartphones, mobile phones, smartwatches, or wearable devices), servers, Web-enabled devices, or Internet of Things (IoT) devices and appliances.

The clients include assets 135A-N that are to be backed up and protected by the data protection backup system. Backup agents 138A-N may be installed at each client. The agents coordinate with the backup server to backup (e.g., copy) the assets to the backup storage system. Some examples of assets include virtual machines (VMs), files, file systems, databases, containers (e.g., a container within a Docker Swarm, Kubernetes, or virtualized computing environment), mailboxes (e.g., one or more Microsoft Exchange mailboxes), or any other unit of data.

As an example, backing up a virtual machine asset may include backing up a virtual hard disk of the virtual machine to the backup storage system. Backing up a file system asset may include backing up all the files within the file system to the backup storage system. Backing up a database asset may include backing up all the records and log files of the database to the backup storage system. Backing up a mailbox may include backing up all the email messages in the mailbox to the backup storage system.

The backups of the assets are secondary copies that can be used in the event that a primary copy becomes unavailable due to, for example, data corruption, accidental deletion, natural disaster, data breaches, hacks, or other data loss event. The backups may be stored in a format such as a compressed format, deduplicated format, or encrypted format that is different from the native source format.

As discussed, the backup server with backup application is responsible for managing and controlling the backups and other data protection jobs. In particular, data protection jobs may include backing up an asset to the backup target storage, replicating a backup copy of the asset to remote backup target storage, moving or replicating a backup copy of the asset from backup target storage to cloud storage (e.g., cloud tiering), moving backups between different backup storage tiers (e.g., moving older or less frequently accessed backups to lower performing but less expensive storage tiers), removing or deleting backups upon expiration of a retention period, and other protection tasks and activities. There can be different types of backups such as full backups, incremental backups, differential backups, full database backups, database logs-only backups, crash-consistent backups, application-consistent backups, and so forth. Data protection jobs may be triggered according to a schedule. For example, a backup job may be configured to occur on an hourly, daily, weekly, or monthly basis, configured to start and end at a particular time, and so forth. The success or failure of a data projection job may be reported on a user interface of the backup application such as on a management dashboard or console.

Data protection jobs are specified and defined through policies. The policies may be referred to as data protection policies. In an embodiment, a data protection policy is used to group multiple assets which share same behaviors such as backup, replication and cloud tiering. When policy is triggered to run, each asset executes the action as a sub-task included in a policy job.

If the sub-tasks are not able to successfully complete they are marked as failed jobs by the system. Typically, a data protection system administrator is responsible for auditing the execution result of policy jobs. It can be a great relief to see the successfully completed jobs and their accompanying green ticks as reported by data protection policies. However, any policy jobs showing a red (failure) or yellow (partial success) in their execution results will require the administrator to conduct an investigation. Such an investigation can be extremely time-consuming because there can be many hundreds or even many thousands of assets.

For example, the administrator user may filter on the failed assets by checking each policy job having a status of unhealthy. Given that policies may be triggered recurrently or at regular intervals, each round of execution of the policy may generate a new failed job. As a result, there may be many failed policy jobs which contain identical failed assets that have to be checked. From a customer's point of view, they may not know that the root cause associated with different job execution rounds for the same asset may be identical. In other words, the failure of different jobs may be due to the same root cause. Many systems, however, lack the ability to trace the job failures to the root cause.

In an embodiment, systems and techniques are provided to move out the failed assets from a policy to avoid interference with other assets in the policy; trace the root cause and resolve the failure by collecting and analyzing logs from different components and services; and move back the failed assets to policies upon verifying that the fix is valid according to operational parameters inherited from protection policies.

A data protection product may support many thousands of assets. It is very difficult for customers to audit the execution of data protection policies using manual processes. From a customer's perspective, the expectation is to recover the failed sub-tasks as soon as possible and before a next round of policy execution. For the recurring jobs such as backup, replication and cloud tiering jobs, the time interval of job execution is determined by a backup policy.

In an embodiment, systems and techniques are provided to mitigate the impact of failed jobs. This is facilitated by an automated backup failure recovery mechanism associated with a data protection policy. The user experience is improved because an administrator does not have to perform a time-consuming investigation to retry failed jobs and trace the root cause. The failure recovery mechanism includes an algorithm to judiciously balance retrying failed jobs and system resources. In an embodiment, the backup system includes a job recovery framework inherited from existing backup policies to automatically recover failed jobs with recoverable and unrecoverable job classification; automatically isolates failed assets to facilitate troubleshooting; implements an adaptive retry of recoverable jobs using an enhanced algorithm to improve system resource utilization and user experience; and filters on the failed assets to identify those needing manual interactions and narrow down the root cause scope for the customer.

In an embodiment, there is a virtual shadow data protection policy to automatically mitigate the impact of failed jobs in a data protection policy. The original data protection policy may be referred to as a primitive data protection policy. There can be a one-to-one mapping between a primitive data protection policy and its corresponding shadow data protection policy. Specifically, the shadow data protection policy is setup or destroyed along with the primitive data protection policy and both the primitive policy and shadow policy share the same configuration. When the system is running, if there are failed jobs generated, then the failed assets are automatically degraded to the shadow policy. The backup system automatically retries failed tasks with a predefined check on known and system recognized fixes via an optimized algorithm. If the retry operations are executed successfully against the failed assets, then the assets are automatically upgraded into the primitive policy. Otherwise, the system narrows down the root cause scope and notifies customer that manual interaction is needed for the specified assets.

Figure 2:
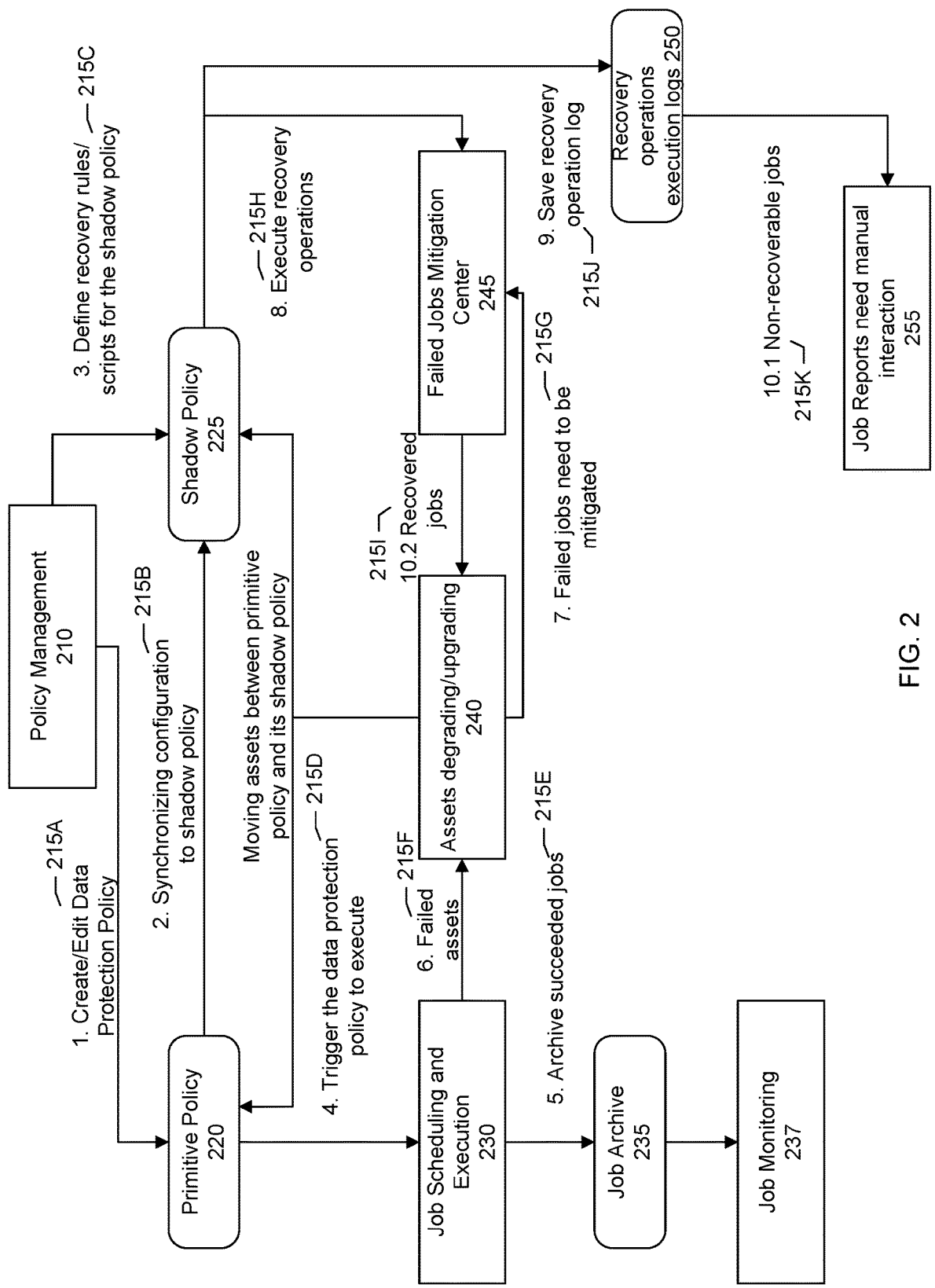
FIG. 2 shows an overall architecture of a system for addressing data protection failures, according to one or more embodiments.

FIG. 2 shows an overall operation and architecture of data protection policy management 210. As shown in the example of FIG. 2, a step 215A of policy management includes creating and editing a data protection policy. The data protection policy may be referred to as a primitive data protection policy 220. In a step 215B, configuration information specified in the primitive data protection policy is synchronized to a shadow data protection policy 225. In a step 215C, recovery rules and scripts are defined for the shadow policy. These recovery rules and scripts may be defined, at least in part, by a vendor or developer of the backup system. In a step 215D, the data protection policy is triggered to execute by a job scheduling and execution component 230.

A result of the execution may be that all assets associated with the data protection job have succeeded with their sub-tasks in fulfilling the data protection job. Alternatively, one or more sub-tasks for one or more assets may have failed to properly complete. In a step 215E, data protection jobs including successful jobs are archived in a job archive 235. A job monitoring component 237 can access the job archive to report job status. In a step 215F, assets that have failed or whose data protection tasks or jobs have failed to complete are identified to an assets degrading/upgrading component 240.

The assets degrading/upgrading component is responsible for moving assets between the primitive data protection policy and the corresponding shadow data protection policy. More particularly, in a step 215G, failed jobs are identified to a failed jobs mitigation center 245. In a step 215H, the mitigation center is responsible for retrying the failed data protection jobs or tasks based on the recovery rules and scripts for the shadow policy. In a step 215I, data protection jobs that can be recovered (e.g., retry operation successful) are indicated to the assets degrading/upgrading component so that the associated assets can be moved from the shadow policy back to the primitive policy.

In some cases, however, the retry operations may not be successful. In a step 215I, recovery operation execution logs 250 are saved. In a step 215K, non-recoverable jobs are reported 255 to the user as manual interaction is needed.

Figure 3:
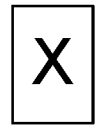
FIG. 3 shows an example of a graphical user interface (GUI) for enabling a shadow policy option, according to one or more embodiments.

In an embodiment, when a customer user defines a data protection policy in a data protection product, the user is prompted to select whether the policy should have a shadow policy or not. FIG. 3 shows an example of a user interface for enabling shadow policy creation.

If customer has enabled this option, then a shadow policy is automatically created or updated along with the primitive policy. In an embodiment, the parameters except the assets members are identical between these two policies. Upon arrival of a time at which the primitive policy is to run, the job scheduling and execution component executes the actions defined in the primitive policy for each asset. If the execution result includes a failure, the job scheduling and execution component moves the failed tasks to the assets degrading/upgrading component. Otherwise the tasks are archived.

The assets degrading/upgrading component moves the assets in the primitive policy to its shadow policy and triggers the mitigation center to conduct recovery operations for the failed assets. The mitigation center executes the recovery operations based on the following framework. First, it automatically retries the failed tasks via an optimized algorithm. If the retry operation is successful, the mitigation center notifies the assets degrading/upgrading component to move the assets from the shadow policy back to the primitive policy. Otherwise, if the retry operation is not successful, the mitigation center collects the recovery operations' execution logs, narrows down the root cause scope in the logs and notifies the customer that manual interaction is required to investigate the failure of an asset to be protected according to the data protection policy. Thus, from the customer users' perspective, they only need to check the assets list which need manual interaction in the job reports. If the customer is able to successfully recover the assets (e.g., run the data protection job), then the assets are moved back to the primitive policy automatically.

Referring back now to FIG. 1, in an embodiment, the backup application includes a policy authoring console 141, shadow policy generator 144, job scheduling and execution unit 147, assets degrading/upgrading unit 150, jobs monitor 153, and a mitigation center 156.

The policy authoring console provides a user interface through which an administrative user can manage policy life cycle (PLC) including defining, configuring, and deploying data protection policies. In an embodiment, the policy authoring console includes an online wizard or setup assistant that guides the user through the policy authoring process. For example, the user can use the setup assistant to create and add a data protection policy, identify and associate assets to the policy (e.g., virtual machines, containers, databases, or file systems), and configure the data protection policy. The configuration may include specifying the data protection jobs to perform (e.g., backup, replication, or cloud tiering), defining a schedule or recurrence interval for the data protection jobs (e.g., backup hourly, backup daily, or replicate weekly), specifying a window or time frame within which such data protection jobs should start and end, specifying retention times or durations for backups, and configuring other parameters and settings depending upon the type of asset to protect and protection job. Authored policies are stored in a policy repository 142.

The shadow policy generator is responsible for generating a shadow data protection policy corresponding to a (primitive) data protection policy. In an embodiment, the shadow data protection policy shares or includes a copy of configuration information from the data protection policy. Changes in configuration to the data protection policy may be pushed to the corresponding shadow policy. For example, if the user makes a change to a backup schedule in a data protection policy, the change may be pushed to a shadow data protection policy corresponding to the (primitive) data protection policy. Shadow data protection policies are stored in a shadow policy repository 162.

The job scheduling and execution unit is responsible for executing the data protection policies. As an example, consider that a set of virtual machine assets are associated to a data protection policy. The data protection policy specifies a backup as a data protection job to occur each hour. Upon the arrival of each hour, the job scheduling and execution unit issues commands to the clients hosting the virtual machine assets instructing that the virtual machine assets be backed up. In response, each agent at each client hosting a virtual machine asset executes a sub-task to backup the virtual machine asset to a backup target storage as configured in the data protection policy. Each agent reports task status to the job scheduling and execution unit. The task status for each backup of a virtual machine asset may be rolled up or aggregated into a policy job execution result or job status. If all sub-tasks are successful (e.g., all virtual machine assets have been backed up), the job status for the data protection policy is marked as successful. If one or more sub-tasks have failed, however, (e.g., one or more virtual machine assets was not able to be properly backed up), the job status is marked as failed (or partial success or partial failure if at least some of the sub-tasks completed successfully). Job status may be archived in a jobs archive 159. As another example, a data protection job may include replicating a set of backed up virtual machine assets from a first backup storage target at a first site to a second backup storage at a second site, geographically remote from the first site. For example, the first site may be located in Las Vegas, Nevada. The second site may be located in Boyers, Pennsylvania.

There can be any number of reasons why a subtask or data protection job may fail to successfully complete. For example, a target storage device may have suffered a failure (e.g., hard disk crash), there may be a bug in the backup application, a patch or software update may not have been installed correctly, there may be incompatible firmware or other software, cabling may have been knocked loose, a client hosting the virtual machine asset may have unexpectedly gone offline, configuration settings may not have been set correctly, a required service may have failed to start, and so forth.

The assets degrading/upgrading component is responsible for moving assets that have failed to be protected from the (primitive) data protection policy to the shadow data protection policy. Once the assets are moved out of the data protection policy (e.g., disassociated from the data protection policy) and moved to the shadow data protection policy (e.g., associated to the shadow data protection policy), the mitigation center executes the shadow data protection policy in an attempt to recover failed data protection jobs.

In an embodiment, the mitigation center includes a retry engine 165, knowledge base 166, log collector 168, log analyzer and clustering engine 171, and a reporting unit 175. The retry engine is responsible for recovering failed data protection jobs by retrying them according to a retry algorithm or mechanism. If the retry operation of a data protection job is successful, the asset associated with the data protection job is moved from the shadow data protection policy back to the (primitive) data protection policy. The knowledge base includes a repository of scripts that may be executed by the retry engine during a retry operation. The scripts may correspond to known fixes that can be used to help address problems with executing data protection jobs.

The retry algorithm limits the number of retries to a threshold or maximum number. Once the threshold has been reached without there having been a successful result, human intervention may be necessary to resolve the issue. The mitigation center facilitates the tracing of the root cause by analyzing the log files and generating a report of the analysis. In particular, log files generated during the retry operations are collected by the log collector and stored in a log repository 178. The log analyzer is responsible for analyzing the log entries and clustering the entries based on severities recorded in the log entries and time intervals during which the log entries were recorded. Further discussion is provided below.

Figure 4:
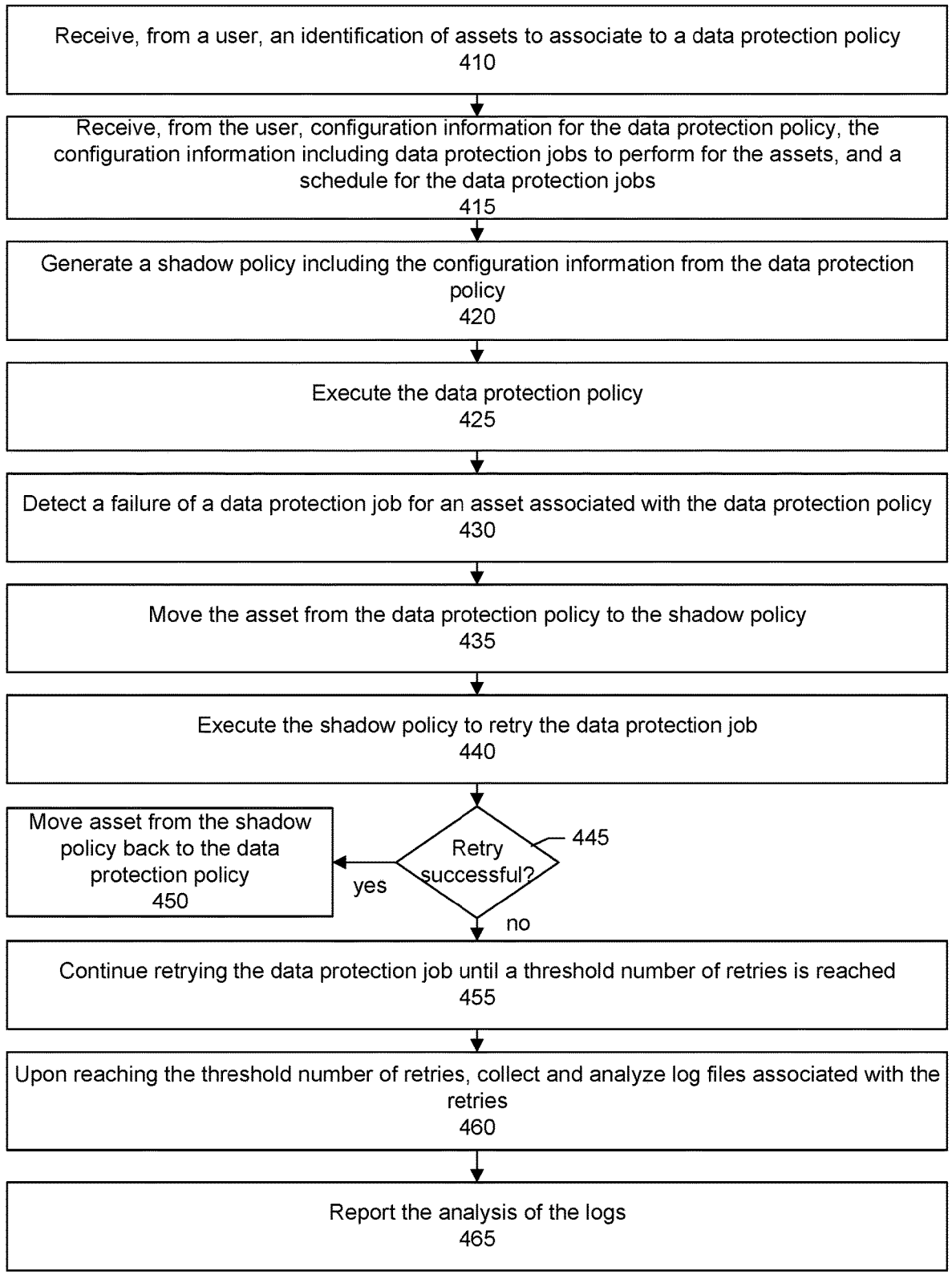
FIG. 4 shows an overall flow for addressing data protection failures, according to one or more embodiments.

FIG. 4 shows an overall flow for mitigating and automating data protection failures. In a step 410, an identification of assets to associate to a data protection policy is received from a user. In a step 415, configuration information for the data protection policy is received from the user. The configuration information may include, for example, a type of data protection job to perform for the assets (e.g., backup, replicate, or cloud tiering), a schedule or recurrence interval according which the data protection job should run, a maximum or threshold number of retries that should be triggered should the data protection job fail to complete successfully, or combinations of these. In a step 420, a shadow policy corresponding to the data protection policy is generated. In an embodiment, generating the shadow policy includes copying the configuration information from the data protection policy to the shadow policy.

Figure 5:
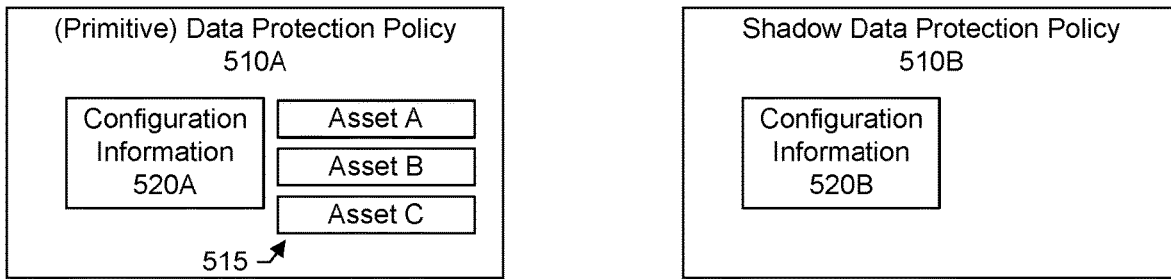
FIG. 5 shows a block diagram of a data protection policy and a corresponding shadow data protection policy, according to one or more embodiments.

FIG. 5 shows a block diagram of an example of a (primitive) data protection policy 510A and a shadow policy 510B that has been generated based on the data protection policy that the user created. As shown in the example of FIG. 5, the data protection policy includes a set of assets 515 (e.g., asset A, asset B, and asset C) associated to the data protection policy. As an example, the assets may be virtual machines that are to be protected by the data protection policy. The data protection policy further includes configuration information 520A. The configuration information specifies a data protection job (e.g., backup) to run and a schedule at which the data protection job should run. The shadow data protection policy includes a copy 520B of the configuration information from the data protection policy.

Referring back now to FIG. 4, in a step 425, the data protection policy is executed or, more specifically, a data protection job specified by the data protection policy is triggered to run according to the schedule or intervals as configured by the user in the data protection policy.

Figure 6:
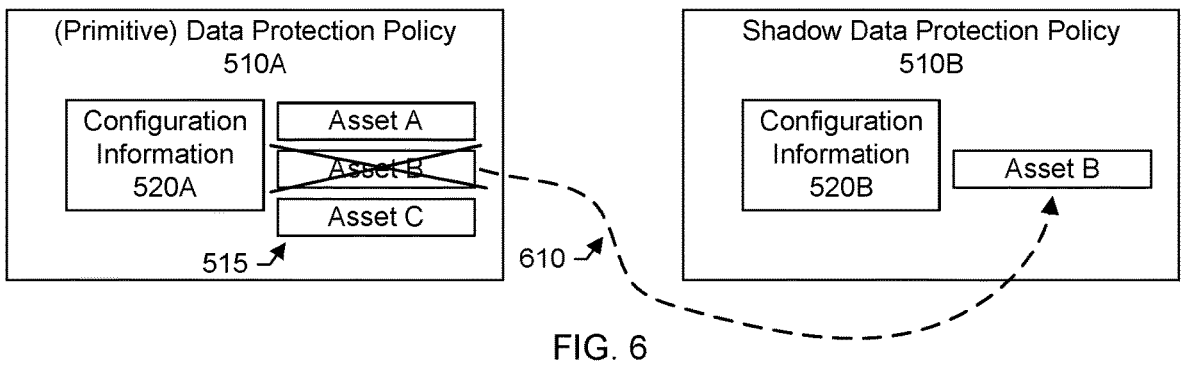
FIG. 6 shows a block diagram of an asset being moved from the data protection policy to the shadow data protection policy, according to one or more embodiments.

In a step 430, a failure of a data protection job for an asset associated with the data protection policy is detected. In a step 435, the asset is moved from the data protection policy to the shadow policy. FIG. 6 shows a block diagram example of a failed asset (e.g., asset B) being moved 610 from primitive data protection policy 510A to corresponding shadow data protection policy 510B. Moving the failed asset out of the primitive data protection policy disassociates the failed asset from the primitive data protection policy. Thus, assets remaining in the primitive data protection policy (e.g., asset A and asset C) can continue to be protected as normal.

The failed asset (e.g., asset B), however, is isolated so that mitigation protocols can be conducted independent of and without interfering with the data protection activities of the other assets (e.g., asset A and asset C). In other words, when the primitive data protection policy is executed at the next scheduled interval as configured in the primitive data protection policy, the data protection job for assets A and C will be triggered. Assuming that the issue with asset B is not resolved by the next scheduled interval, asset B will not be subject to the regularly scheduled data protection job because asset B has been moved to the shadow data protection policy.

Referring back now to FIG. 4, in a step 440, the shadow policy is executed to retry the data protection job on the failed asset. A retry algorithm is shown in FIGS. 8 and 9 and described in the accompanying discussion.

Figure 7:
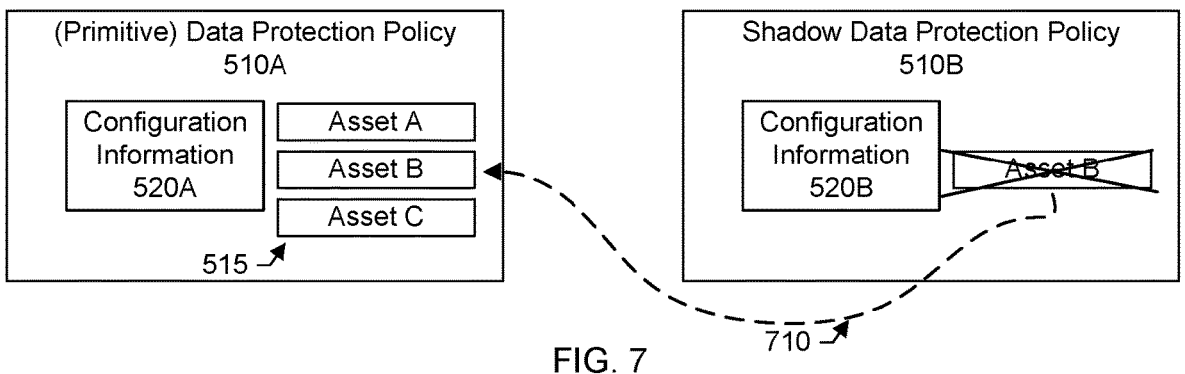
FIG. 7 shows a block diagram of the asset being moved from the shadow data protection policy back to the data protection policy, according to one or more embodiments.

In a step 445, a determination is made as to whether the retry was successful. If the retry was successful, the asset is moved from the shadow data protection policy back to the primitive data protection policy (step 450). FIG. 7 shows a block diagram example of an asset (e.g., asset B) being moved 710 from shadow data protection policy 510B back to primitive data protection policy 510A because the retry operation to protect asset B has succeeded. The moving of asset B back to the primitive data protection policy re-establishes the association of asset B to the primitive data protection policy. Thus, when the primitive data protection policy is executed at the next scheduled interval as configured in the primitive data protection policy, the data protection job for each of assets A and C along with asset B will be triggered.

Figure 8:
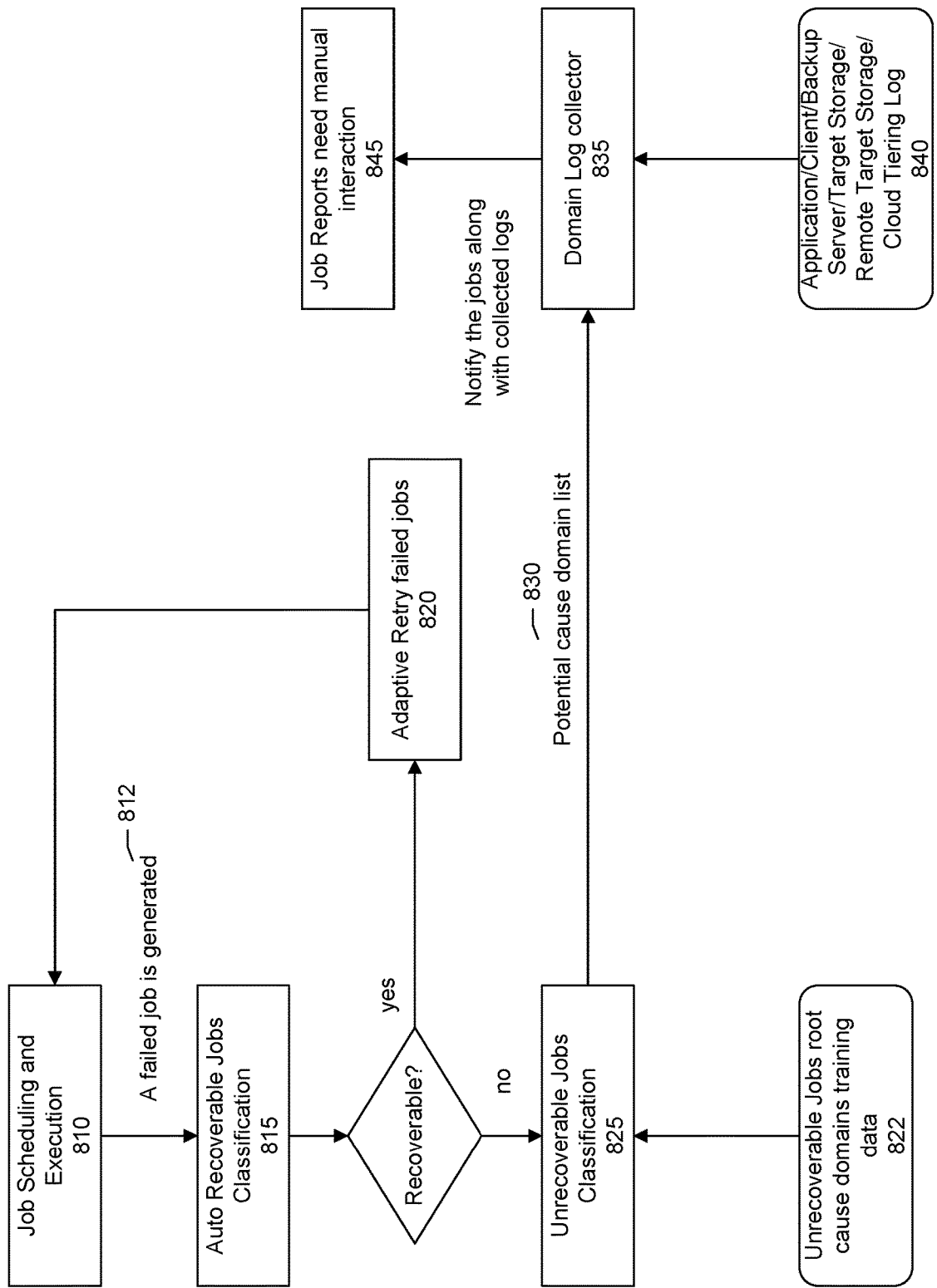
FIG. 8 shows a framework for recovering a data protection job, according to one or more embodiments.

Referring back now to FIG. 4, if, however, the retry operation to protect the asset is not successful, the retry algorithm continues retrying the data protection job until a threshold or maximum number of retry operations is reached (step 455) (see, e.g., FIGS. 8 and 9 and accompanying discussion).

Figure 11:
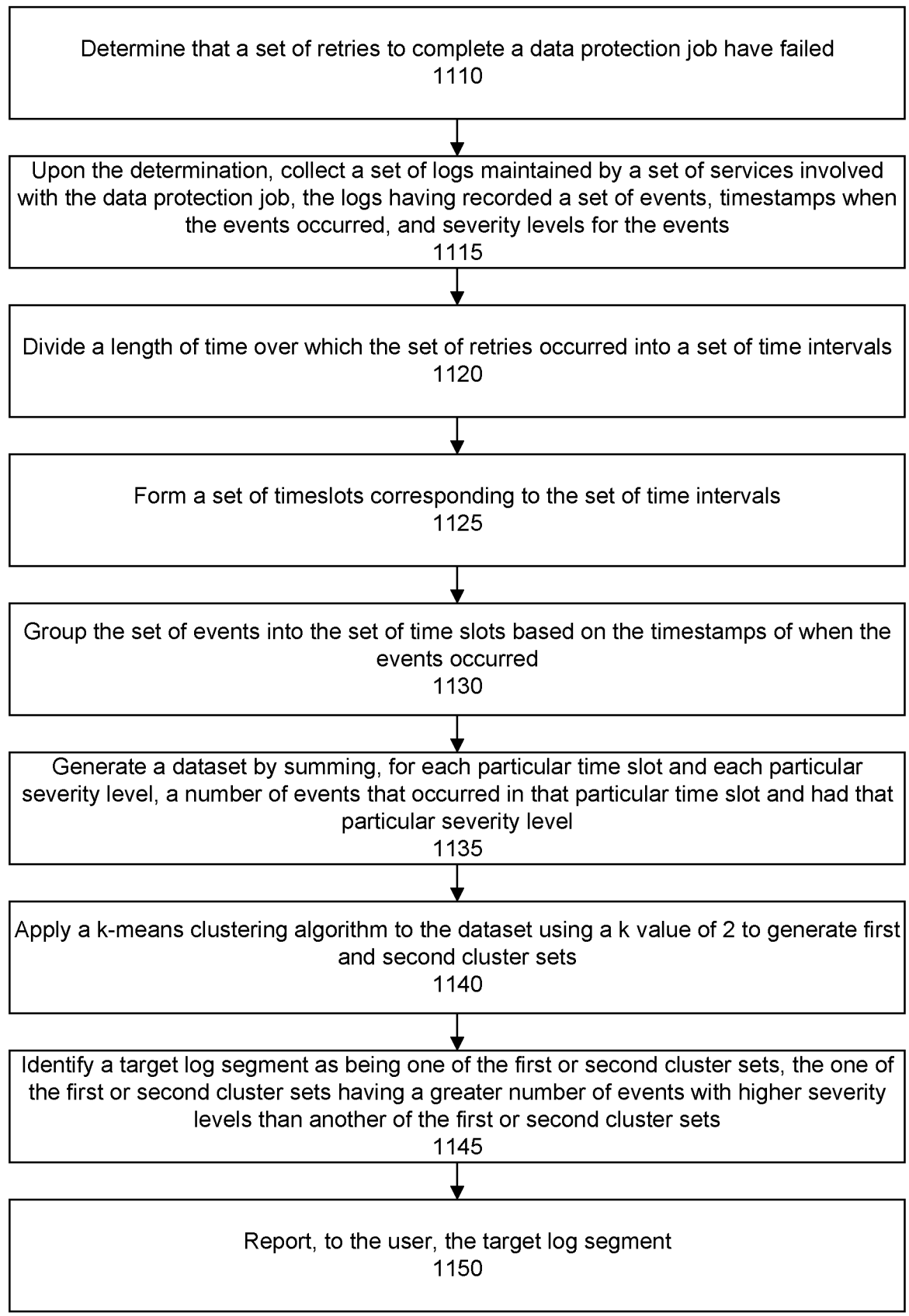
FIG. 11 shows further detail of the flow for analyzing log files, according to one or more embodiments.

In a step 460, upon reaching the threshold number of retries without having succeeded in protecting the asset, log files associated with the retries are collected and analyzed. The log collection and analysis process is shown in FIGS. 8, 10, and 11 and described in the accompanying discussion. In a step 465, the analysis of the logs is reported to the user so that the user can investigate the issue.

Consider, as an example, that a set of virtual machine assets, e.g., VM A, VM B, and VM C, are associated with a data protection policy. VMs A-C are hosted by clients A-C, respectively. A data protection job of the data protection policy specifies that the assets (e.g., VMs A-C) are to be backed up at hourly intervals. Upon the arrival of a first hour (e.g., T1), respective sub-tasks are executed to backup each of VMs A-C from the client hosts to a backup storage target. Suppose that the backup of VMs A and C complete successfully, but that the backup of VM B fails. In this case, VM B is moved out of the (primitive) data protection policy and into a corresponding shadow data protection policy. Thus, upon arrival of a second or next hour (e.g., T2), sub-tasks will be executed to backup VMs A and C to the backup storage target as configured in the primitive data protection policy. The backup of VM B, however, will be subject to the recovery or retry algorithm and protocol of the shadow data protection policy.

FIG. 8 shows an overall flow of a recovery framework for failed jobs according to a shadow policy. In an embodiment, failed jobs can be classified into one of two categories. A first category may be referred to as automatic recoverable. Jobs categorized as automatic recoverable can be recovered without user intervention. A second category may be referred to as unrecoverable jobs which need manual interactions.

In an embodiment, for the recoverable jobs, there can be an option for the customer to manually retry the job. In another embodiment, the system retries the failed jobs based on a predefined interval until the amount of retry times has reached the predefined threshold value.

In an embodiment, the duration of the retry interval increases after each failed retry. From a system resource utilization point of view, it can be desirable that with the increasing number of job retry times, the interval of a next round for a retry operation is increased also. From a customer's point of view, it can be desirable to provide the maximum or threshold retry times configuration for the system. In this specific embodiment, the system automatically determines the retry time interval value. In an embodiment, an algorithm is provided that retries failed jobs based on a configured maximum or threshold number of retries, a configured recurrence interval as defined in the schedule of the data protection policy, a current count of a number of failed retries, and a random time value. Further discussion is provided below.

As discussed, in some cases it might not be possible for the system to recover a failed job and manual intervention may be required. Nonetheless, instead of simply reporting a failed job, systems and techniques are provided to help identify the root cause. Below are some actions that may be taken to help identify the root cause:

1) Narrow down potential root cause scope based on error code and collected log bundle. One or more of the following domains may be included in the investigation process:
1a) Application domain
1b) Client domain
1c) Business service domain including replication service, backup service, cloud tiering service, or disaster recovery service.
1d) Target storages domain
1e) Remote storages domain
1f) Remote Cloud domain
2) Attempt to obtain a knowledge base (KB) instruction based on collected log information. Instead or additionally, report the problems to technical support along with collected logs if the problem has not been recorded in the KB.

As shown in the example of FIG. 8, when a job scheduling and execution component 810 generates a failed job 812, an auto recoverable job classification 815 and adaptive retry 820 will be performed on the recoverable jobs using one or more predefined fixes 822. If the job continues to fail, then it will be recognized as an unrecoverable job 825.

In an embodiment, for the unrecoverable jobs, system will retry the job to reproduce the failure one time. When the failure occurs, system notifies 830 a domain log bundle collector component 835 to collect all the components/services log files 840 which were generated during the retry process. The collected logs are used by a potential cause identifier component to identify potential root cause domains. A further discussion of a technique to analyze the collected logs is provided below. Finally, a listing of assets which need manual intervention is reported 845 to the customer user. In addition to the asset information, potential root cause scope and related logs are also provided to the customer user for further checking.

FIG. 9 shows further detail of a flow for retrying failed jobs. In an embodiment, the algorithm for retrying failed jobs provides for a balancing of system resource utilization and a good user experience. From the customer's perspective, there is a maximum or threshold number of retry times that is provided at the system level.

In an embodiment, when a retry operation has failed, the system pauses or delays another attempt to retry the operation. The unit of waiting time for a next round of a retry operation is dynamically calculated based on a policy recurrence interval value and maximum or threshold number of retry times. As the number of times a retry operation fails increases, so too do the units of waiting times for a next round of the retry operation. Further, to avoid the concurrent retrying of jobs, a random time value is added to a waiting time of a next round.

Table A below shows a listing of variables used to calculate the wait time for a next round of a retry operation.

TABLE A

| Variable Name | Symbol |
| --- | --- |
| Maximum or threshold retry times | Mt |
| Policy recurrence interval value | Pi |
| Retry times | n |

In an embodiment, the maximum or threshold number of retry times is configured at the system level. There can be a default configuration value that can be overridden or reconfigured by an administrative user. The policy recurrence interval value may be obtained from a data protection job schedule as configured in a data protection policy. For example, a schedule that specifies hourly backups would have a policy recurrence interval value of 1 hour or 60 minutes. A schedule that specifies daily backups would have a policy recurrence interval value of 24 hours or 1,440 minutes, and so forth. The retry times variable represents a current count of the number of past consecutive retry operations that were unsuccessful. As an example, let us use $W_n$ to represent the waiting time of n round of a retry operation. Below is a formula for calculating the waiting time to obtain the waiting time of n round for the retry operation.

$$Rt \sim N\left(\left[0, \frac{Pi}{Mt}\right]\right)$$

$$W_n = (2^n - 1) * \left(\frac{Pi}{Mt}\right) + Rt$$

$$n \leq Mt$$

$\frac{Pi}{Mt}$ represents the unit of waiting time.

$Rt$ represents a random value between 0 and $\frac{Pi}{Mt}$.

The above formula allows for dynamically determining the waiting time for a next round of a retry operation. When a retry operation fails, the wait time for a next retry operation increases until a threshold number of retries is reached. Thus, the wait time is not a fixed interval. Further, even within the same data protection policy, the waiting time of each retry operation will be different due to the random time value that is added to the base time calculation. Adding a random time value to the base time calculation helps to avoid massive concurrent retry jobs that can tax system resources.

Referring now to FIG. 9, in a step 910, a base time value is calculated as a function of a threshold maximum number of retries, a policy recurrence interval value, and a current count of a number of unsuccessful retries, where the base time value increases with each unsuccessful retry. Increasing the base time value after an unsuccessful retry provides time for a potentially failed service to recover. In a step 915, a random time value is calculated and added to the base time value to obtain a wait time. In a step 920, after the wait time has elapsed, the data protection job is retried. Adding a random time to the base time helps to reduce the probability that multiple retry operations will occur at the same time.

In an embodiment, there is a method including: determining that a data protection job has failed; calculating a first base time value based on a threshold number of times a failed data protection job should be retried, a time interval at which the data protection job is scheduled to reoccur, and a current count of a number of failed retries; adding a first random time value to the first base time value to obtain a first wait time; after the first wait time has elapsed, retrying the data protection job; determining that the retry of the data protection job has failed; calculating a second base time value based on the threshold number of times the failed data protection job should be retried, the time interval at which the data protection job is scheduled to be reoccur, and the current count of the number of failed retries, the second base time value being greater than the first base time value; adding a second random time value to the second base time value to obtain a second wait time; and after the second wait time has elapsed, retrying the data protection job.

FIG. 10 shows further detail of a flow for analyzing log files to narrow down a potential root cause scope for failed data protection jobs. In an embodiment, an algorithm narrows down a potential root cause scope for failed jobs based on the collected logs. The algorithm uses a K-means clustering algorithm. The clustering algorithm can be used to find groups in the data, with the number of groups represented by the variable K. The clustering algorithm works by iteratively assigning each data point to one of K groups based on a set of features. Data points are clustered based on feature similarity.

The causes of most failed jobs typically cross multiple services or components. When a job fails, there is likely to be a chain of higher severity log information generated in different services or component log files at or about the same time. Many times, such segments of log information can be very helpful for the customer to be able to uncover the root cause. The algorithm locates such potential log information in the full log files.

In an embodiment, once a threshold number of retries has been reached without a data protection job having successfully completed, log files associated with one or more of the retries are collected and parsed (step 1010). In a step 1015, log entries in the log files are clustered based on severities recorded in the log entries and time intervals during which the log entries were recorded.

The data protection or backup system may have many different components including services, operating systems, applications, and programs that interact with each other during execution of the data protection job. These different components or services may each generate log files. A log file is a record of events or messages recorded and maintained by a particular component. The information contained in these log files may be helpful in diagnosing the cause of the failed data protection job. Thus, log files may be collected from each of the different components or services involved with the data protection job. For example, a log file may be collected from the backup application, another log file may be collected from a backup storage target, another log file may be collected from the cloud storage provider, another log file may be collected from a client whose assets were supposed to be protected by the data protection job, and another log file may be collected from the server running the backup application.

In an embodiment, the log files for each component or service are collected and parsed to generate a set of datasets for a clustering analysis. For example, table B below shows an example of some entries from a log file maintained by a Microsoft Windows® operating system (OS). This log file may be referred to as component-based servicing or "cbs.log" file.

TABLE B

| Timestamp | Log Entry Severity |
| --- | --- |
| 2019-08-12T16:31:39.710Z | INFO |
| 2019-08-12T16:31:39.712Z | INFO |
| ... | ... |
| 2019-08-12T19:04:12.093Z | WARN |
| 2019-08-12T19:07:59.599Z | ERROR |

Table C below shows an example of some entries from a virtual machine log file, e.g., "vmdm.log."

TABLE C

| Timestamp | Log Entry Severity |
| --- | --- |
| 2019-08-12T16:31:39.711Z | WARN |
| 2019-08-12T16:31:39.723Z | INFO |
| ... | ... |
| 2019-08-12T19:04:12.095Z | WARN |
| 2019-08-12T19:07:59.589Z | ERROR |

As shown in the examples of tables B and C above, each log entry includes a timestamp indicating a point in time when the entry was recorded and a severity rating of an event corresponding to the entry.

In an embodiment, a time interval variable "T" is defined. This time interval is used to divide each of the log file datasets as shown in table D below.

TABLE D

| $T_1$ | $T_2$ | cbs.log | $T_n$ |
| --- | --- | --- | --- |
| $T_1$ | $T_2$ | vmdm.log | $T_n$ |

Based on the division result, new datasets are constructed as follows. Each new dataset contains all the log entry severity data from the different components or services. The log entries within a dataset share a same timeframe. For example, table E below shows entries for a first time interval $T_1$.

TABLE E

| Timestamp | Log Entry Severity |
| --- | --- |
| 2019-08-12T16:31:39.710Z | INFO |
| 2019-08-12T16:31:39.712Z | INFO |
| ... | ... |
| 2019-08-12T16:31:39.093Z | WARN |
| 2019-08-12T16:31:40.001Z | ERROR |

Table F below shows entries for a second time interval $T_2$.

| Timestamp | Log Entry Severity |
| --- | --- |
| 2019-08-12T16:31:40.710Z | INFO |
| 2019-08-12T16:31:40.712Z | ERROR |
| ... | ... |
| 2019-08-12T16:31:40.093Z | WARN |
| 2019-08-12T16:31:41.001Z | ERROR |

For each above dataset categorized by time interval index T, the log analysis moves to calculating a log entry amount grouped by severity type and converts the above datasets to a dataset as shown in the example of table G below.

TABLE G

| Time Interval Index | INFO | WARN | ERROR | FATAL |
| --- | --- | --- | --- | --- |
| $T_1$ | 20 | 2 | 0 | 0 |
| $T_2$ | 25 | 2 | 0 | 0 |
| ... | ... | ... | ... | ... |
| $T_n$ | 20 | 3 | 3 | 0 |

Based on the final converted dataset as shown in the example of table G above, a K-means algorithm is applied by setting a K value to "2" as the cluster samples. The output of clustering thus includes two sets. Each set includes a corresponding time interval index. The set which includes the greater number of log entries with higher severity is identified as the target log segment. The target log segment may then be reported to the administrative user.

FIG. 11 shows further detail of a flow for collecting and analyzing logs. In a step 1110, a determination is made that a set of retries to complete a data protection job have failed. In a step 1115, upon the determination, a set of logs maintained by a set of services or components involved with the data protection job are collected. These services may be associated with operating systems, backup storage targets, the backup or data protection application, or any other component associated or involved with the data protection job. The logs include a recorded set of events, timestamps when the events occurred, and severity levels for the events. A severity level indicates a relative impact of an event. For example, events classified with high severity levels such as "error" or "fatal" may be considered to have a greater impact on the success or failure of the data protection job as compared to events classified with lower severity levels such as "info" or "warn."

In a step 1120, a length of time over which the retries occurred are divided into a set of equal time intervals. In a step 1125, a set of time slots are formed or defined corresponding to the set of time intervals. In a specific embodiment, the time interval is 2 seconds. As an example, consider that the retries occurred from 9:00:00.00 AM to 9:20:00.00 AM. In this example, the length of time over which the retries occurred is 20 minutes. A first time slot is from 9:00:00.00 AM to 9:00:01.99 AM. A second time slot is from 9:00:02.00 AM to 9:00:03.99 AM. A third time slot is from 9:00:04.00 AM to 9:00:04.99 AM, and so forth. It should be appreciated that the time interval of 2 seconds is merely an example and other periods of time may instead be used. For example, the time interval may be 1 second, 3 seconds, 4 seconds, 5 seconds, or more than 5 seconds.

In a step 1130, the set of events are grouped into the set of time slots based on the timestamps of when the events occurred. As an example, consider that a first event from a first log maintained by a first service was recorded at 9:00:01.00 AM, a second event from the first log maintained by the first service was recorded at 9:00:02.14 AM, and a third event from a second log maintained by a second service was recorded at 9:00:01.37 AM. In this case, the first and third events are grouped into the first time slot. The second event is grouped into the second time slot.

In a step 1135, a dataset is generated by summing, for each particular time slot and each particular severity level, a number of events that occurred in that particular time slot and had that particular severity level. An example of the dataset is shown in table G above. As shown in the example of table G, for a first timeslot (or time interval) $T_1$, there were 20 events having a severity level of "INFO," 2 events having a severity level of "WARN," 0 events having a severity level of "ERROR," and 0 events having a severity level of "FATAL." For a second timeslot (or time interval) $T_2$, there were 25 events having a severity level of "INFO," 2 events having a severity level of "WARN," 0 events having a severity level of "ERROR," and 0 events having a severity level of "FATAL," and so forth.

In a step 1140, a k-means clustering algorithm is applied to the dataset using a k value of 2 to generate first and second cluster sets. In a step 1145, a target log segment is identified from the first and second cluster sets, the target log segment being one of the first or second cluster sets having a greater number of events with higher severity levels than another of the first or second cluster sets. In a step 1150, the target log segment is reported to the user.

More particularly, the k-means clustering algorithm is an iterative algorithm that attempts to partition the dataset into k-pre-defined (e.g., 2) distinct non-overlapping subgroups (e.g., clusters) where each data point belongs to only one group. The algorithm can be used to identify subgroups in the data such that data points in the same subgroup (cluster) are very similar while data points in different clusters are very different.

The clustering algorithm, as applied to the log dataset facilitates identifying, from across different multiple logs maintained by different multiple services, a particular portion or subset of entries and events that are most likely to contain clues about why the data protection job failed. The clustering helps to identify which particular time slots generated the most severe errors as compared to other time slots.

In an embodiment, the data protection system, rather than simply reporting execution results at the policy level during job monitoring, includes a retry mechanism to retry failed jobs while helping to reduce bottlenecking of system resources. Further, if the retries are unsuccessful, the data protection system does not merely report the unsuccessful attempts to retry the data protection job. Instead, the data protection system collects and analyzes the log files to help the user identify the root cause problem.

Below are some benefits of the data protection system.
1) Reduces need to manually audit each policy job execution result with unhealthy status. An execution round may include many failed assets that are identical. If there are thousands of assets to be protected in the system, it can be very time-consuming and cumbersome to review the many thousands of assets.
2) Automatically isolates failed assets and attempts to recover them, thereby providing an improved troubleshooting experience.
3) Facilitates, for failed jobs, identifying the root cause. The customer or technical support team user is not overwhelmed with having to sort through, review, and analyze a large bundle of logs that may be present in a distributed system which contains numerous services. Systems and techniques are provided to automatically filter on the failed assets which truly need manual interactions and narrow down the root cause scope for the customer user.
4) Reduces a need for the customer need to define time interval value for retrying failed jobs.
5) Helps to balance system resources and prevent bottlenecks. There can be a large number of failed jobs. Automatically retrying them at the same time can cause system performance issues. Thus, as discussed, a wait time is calculated using, in part, a random time value to help reduce the probability of multiple retry operations being triggered at the same time. Systems and techniques are provided to dynamically determine the waiting time of next round of retry operations to optimize the system resource utilization and avoid letting customer providing the same which creates unexpected issues. Systems and techniques are provided for an adaptive retry of recoverable jobs with an enhanced algorithm to improve system resource utilization and the user experience.
6) Provides a job recovery framework inherited from existed backup policies to automatically recover failed jobs with recoverable and unrecoverable job classification.

In a specific embodiment, there is a method comprising: associating assets to a data protection policy; receiving configuration information for the data protection policy, the configuration information comprising a data protection job to perform for the assets, and a schedule for the data protection job; generating a shadow policy comprising the configuration information from the data protection policy; executing the data protection policy; detecting a failure of the data protection job for an asset associated with the data protection policy; moving the asset from the data protection policy to the shadow policy; and executing the shadow policy, the execution comprising: calculating a base time value; adding a random time value to the base time value to obtain a wait time; and after the wait time has elapsed, retrying the data protection job.

The method may include if the retry is successful, moving the asset from the shadow policy back to the data protection policy; and if the retry is unsuccessful and a threshold number of retries has not been reached, repeating execution of the shadow policy; and upon reaching the threshold number of retries, collecting log files associated with the retries; and clustering log entries in the log files based on severities recorded in the log entries and time intervals during which the log entries were recorded. In an embodiment, the calculating the base time value further comprises increasing the base time value with each unsuccessful retry.

The method may include receiving a change to the configuration information for the data protection policy; and updating the data protection policy and the shadow policy with the change. The method may include prompting a user to enable shadow policy creation.

In an embodiment, the method includes: determining that each retry was unsuccessful and a threshold number of retries has been reached; collecting a plurality of logs maintained by a plurality of services involved with the data protection job, the logs having recorded a set of events, timestamps when the events occurred, and severity levels for the events; dividing a length of time over which the retries occurred into a plurality of time intervals; forming a plurality of timeslots corresponding to the plurality of time intervals; grouping the plurality of events into the plurality of timeslots based on the timestamps of when the events occurred; generating a dataset by summing, for each particular timeslot and each particular severity level, a number of events that occurred in that particular timeslot and had that particular severity level; applying k-means clustering to the dataset to generate first and second cluster sets; identifying one of the first or second cluster sets as being a target log segment based on the one of the first or second cluster sets having a greater number of events with higher severity levels than another of the first or second cluster sets; and reporting, to a user, the target log segment.

In another embodiment, there is a system comprising: a processor; and memory configured to store one or more sequences of instructions which, when executed by the processor, cause the processor to carry out the steps of: associating assets to a data protection policy; receiving configuration information for the data protection policy, the configuration information comprising a data protection job to perform for the assets, and a schedule for the data protection job; generating a shadow policy comprising the configuration information from the data protection policy; executing the data protection policy; detecting a failure of the data protection job for an asset associated with the data protection policy; moving the asset from the data protection policy to the shadow policy; and executing the shadow policy, the execution comprising: calculating a base time value; adding a random time value to the base time value to obtain a wait time; and after the wait time has elapsed, retrying the data protection job.

In another embodiment, there is a computer program product, comprising a non-transitory computer-readable medium having a computer-readable program code embodied therein, the computer-readable program code adapted to be executed by one or more processors to implement a method comprising: associating assets to a data protection policy; receiving configuration information for the data protection policy, the configuration information comprising a data protection job to perform for the assets, and a schedule for the data protection job; generating a shadow policy comprising the configuration information from the data protection policy; executing the data protection policy; detecting a failure of the data protection job for an asset associated with the data protection policy; moving the asset from the data protection policy to the shadow policy; and executing the shadow policy, the execution comprising: calculating a base time value; adding a random time value to the base time value to obtain a wait time; and after the wait time has elapsed, retrying the data protection job.

Figure 12:
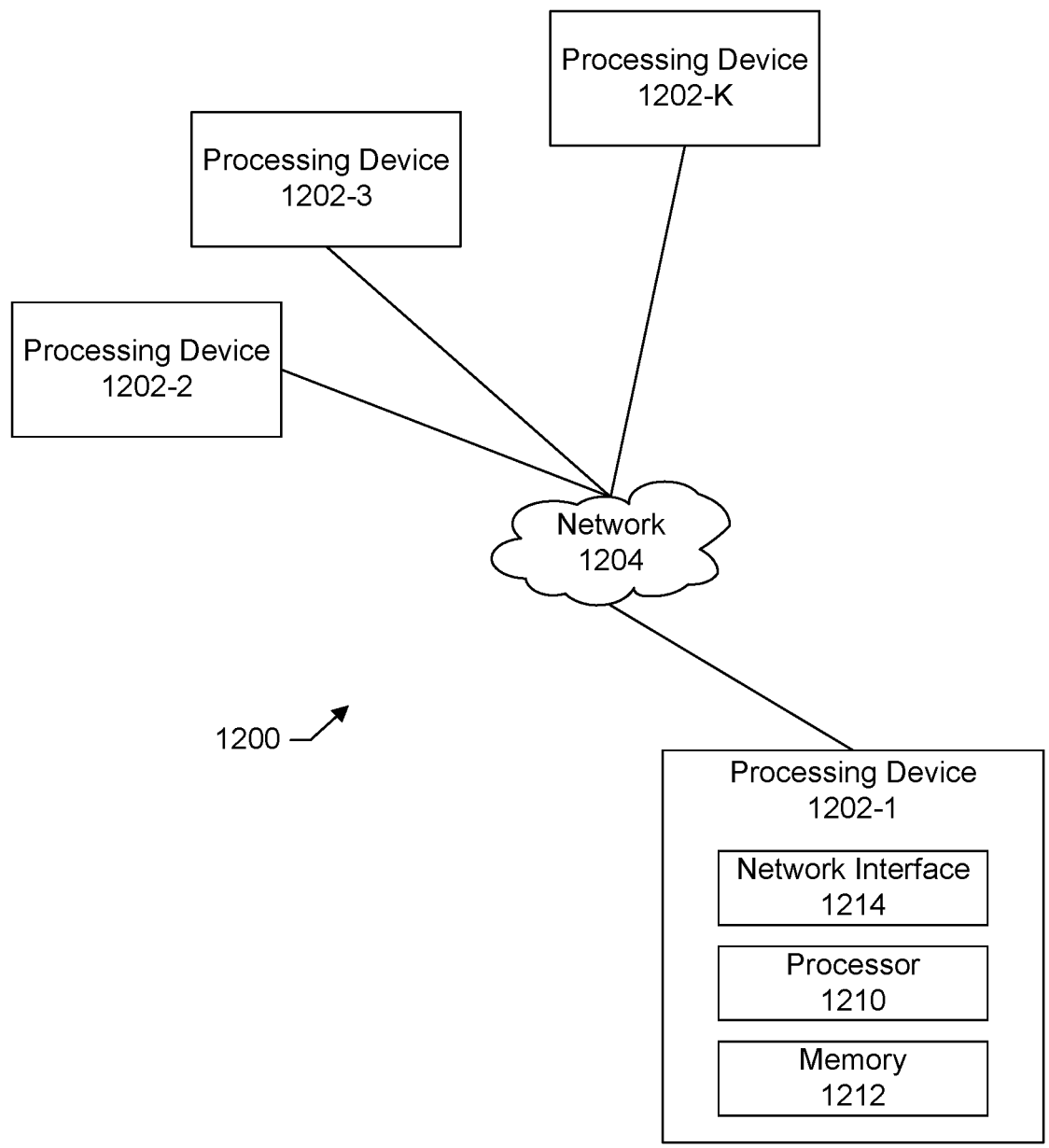
FIG. 12 shows another block diagram of a processing platform that may be utilized to implement at least a portion of an information processing system, according to one or more embodiments.

FIG. 12 shows an example of a processing platform 1200 that may be used with the information processing system shown in FIG. 1.

The processing platform 1200 in this embodiment comprises a portion of system 100 and includes a plurality of processing devices, denoted 1202-1, 1202-2, 1202-3, . . . 1202-K, which communicate with one another over a network 1204.

The network 1204 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1202-1 in the processing platform 1200 comprises a processor 1210 coupled to a memory 1212.

The processor 1210 may comprise a microprocessor, a microcontroller, an application-specific integrated circuit (ASIC), a field-programmable gate array (FPGA) or other type of processing circuitry, as well as portions or combinations of such circuitry elements.

The memory 1212 may comprise random access memory (RAM), read-only memory (ROM) or other types of memory, in any combination. The memory 1212 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1202-1 is network interface circuitry 1214, which is used to interface the processing device with the network 1204 and other system components, and may comprise conventional transceivers.

The other processing devices 1202 of the processing platform 1200 are assumed to be configured in a manner similar to that shown for processing device 1202-1 in the figure.

Again, the particular processing platform 1200 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxRack™ FLEX, VxBlock™, or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of an information processing system as disclosed herein can be implemented at least in part in the form of one or more software programs stored in memory and executed by a processor of a processing device. For example, at least portions of the functionality of one or more components of the compute services platform 100 are illustratively implemented in the form of software running on one or more processing devices.

Figure 13:
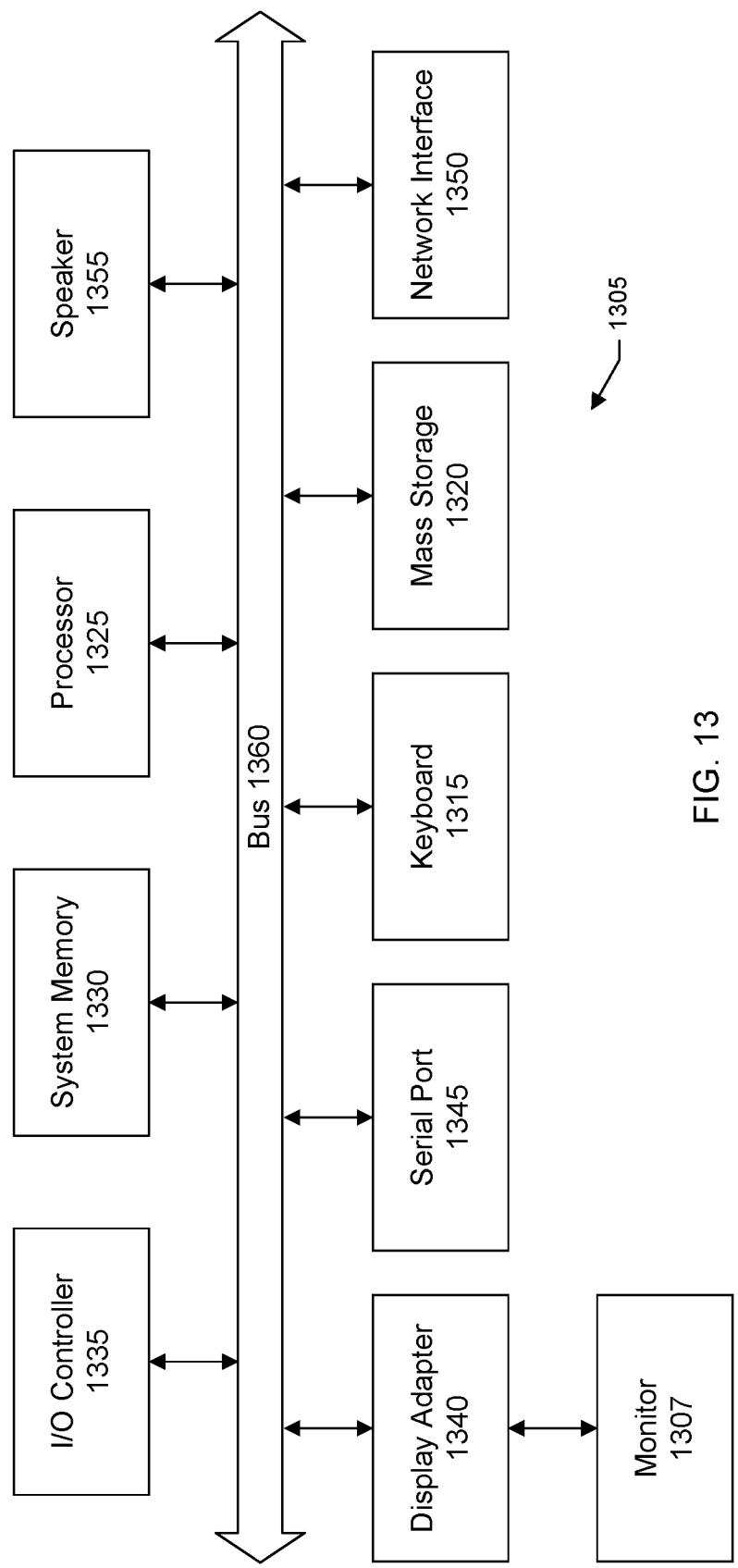
FIG. 13 shows a block diagram of a computer system suitable for use with the system, according to one or more embodiments.

FIG. 13 shows a system block diagram of a computer system 1305 used to execute the software of the present system described herein. The computer system includes a monitor 1307, keyboard 1315, and mass storage devices 1320. Computer system 1305 further includes subsystems such as central processor 1325, system memory 1330, input/output (I/O) controller 1335, display adapter 1340, serial or universal serial bus (USB) port 1345, network interface 1350, and speaker 1355. The system may also be used with computer systems with additional or fewer subsystems. For example, a computer system could include more than one processor 1325 (i.e., a multiprocessor system) or a system may include a cache memory.

Arrows such as 1360 represent the system bus architecture of computer system 1305. However, these arrows are illustrative of any interconnection scheme serving to link the subsystems. For example, speaker 1355 could be connected to the other subsystems through a port or have an internal direct connection to central processor 1325. The processor may include multiple processors or a multicore processor, which may permit parallel processing of information. Computer system 1305 shown in FIG. 13 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system may be one of the Microsoft Windows®. family of systems (e.g., Windows Server), Linux, Mac OS X, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless. For example, signals from a computer may be transferred, at least in part, wirelessly to components or other computers. The variable N and other similar index variables are assumed to be arbitrary positive integers greater than or equal to two.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment. Other embodiments include systems and non-volatile media products that execute, embody or store processes that implement the methods described above.

What is claimed is:

1. A method comprising:
receiving a plurality of assets to associate to a data protection policy;
receiving configuration information for the data protection policy, the configuration information comprising a data protection job to perform for the assets, and a schedule for the data protection job;
generating a shadow policy comprising the configuration information from the data protection policy, and a retry protocol;
performing the data protection job according to the schedule in the data protection policy;
detecting a failure of the data protection job for an asset associated with the data protection policy;
moving the asset out of the data protection policy and into the shadow policy;
retrying the data protection job for the asset according to the retry protocol in the shadow policy;
determining that a threshold number of retries has been reached without the data protection job having been successfully completed;
upon the determination, collecting a plurality of logs maintained by a plurality of services involved with the data protection job, the logs having recorded a set of events, timestamps when the events occurred, and severity levels for the events;
dividing a length of time over which the retries occurred into a plurality of time intervals;
forming a plurality of timeslots corresponding to the plurality of time intervals;
grouping the plurality of events into the plurality of timeslots based on the timestamps of when the events occurred;
generating a dataset by summing, for each particular timeslot and each particular severity level, a number of events that occurred in that particular timeslot and had that particular severity level;
applying k-means clustering to the dataset to generate first and second cluster sets;
identifying one of the first or second cluster sets as being a target log segment based on the one of the first or second cluster sets having a greater number of events with higher severity levels than another of the first or second cluster sets; and
reporting, to a user, the target log segment.

2. The method of claim 1 wherein the retrying the data protection job further comprises:
increasing, with each failed retry of the data protection job, a duration of a time interval after which the data protection job is retried.

3. The method of claim 1 wherein the retrying the data protection job further comprises:
waiting for a wait time to elapse before retrying the data protection job, wherein the wait time comprises a random amount of time added to a base time.

4. The method of claim 1 wherein the data protection policy and the shadow policy execute independently of each other.

5. The method of claim 1 further comprising:
when a retry of the data protection job for the asset has been successful, moving the asset out of the shadow policy and back into the data protection policy.

6. The method of claim 1 further comprising:
synchronizing the configuration information in the shadow policy with changes made to the configuration information in the data protection policy.

7. A system comprising: a processor; and memory configured to store one or more sequences of instructions which, when executed by the processor, cause the processor to carry out the steps of:
receiving a plurality of assets to associate to a data protection policy;
receiving configuration information for the data protection policy, the configuration information comprising a data protection job to perform for the assets, and a schedule for the data protection job;
generating a shadow policy comprising the configuration information from the data protection policy, and a retry protocol;
performing the data protection job according to the schedule in the data protection policy;

detecting a failure of the data protection job for an asset associated with the data protection policy;

moving the asset out of the data protection policy and into the shadow policy;

retrying the data protection job for the asset according to the retry protocol in the shadow policy;

determining that a threshold number of retries has been reached without the data protection job having been successfully completed;

upon the determination, collecting a plurality of logs maintained by a plurality of services involved with the data protection job, the logs having recorded a set of events, timestamps when the events occurred, and severity levels for the events;

dividing a length of time over which the retries occurred into a plurality of time intervals;

forming a plurality of timeslots corresponding to the plurality of time intervals;

grouping the plurality of events into the plurality of timeslots based on the timestamps of when the events occurred;

generating a dataset by summing, for each particular timeslot and each particular severity level, a number of events that occurred in that particular timeslot and had that particular severity level;

applying k-means clustering to the dataset to generate first and second cluster sets;

identifying one of the first or second cluster sets as being a target log segment based on the one of the first or second cluster sets having a greater number of events with higher severity levels than another of the first or second cluster sets; and reporting, to a user, the target log segment.

8. The system of claim 7 wherein the retrying the data protection job further comprises:

increasing, with each failed retry of the data protection job, a duration of a time interval after which the data protection job is retried.

9. The system of claim 7 wherein the retrying the data protection job further comprises:

waiting for a wait time to elapse before retrying the data protection job, wherein the wait time comprises a random amount of time added to a base time.

10. The system of claim 7 wherein the data protection policy and the shadow policy execute independently of each other.

11. The system of claim 7 wherein the processor further carries out the steps of:

when a retry of the data protection job for the asset has been successful, moving the asset out of the shadow policy and back into the data protection policy.

12. The system of claim 7 wherein the processor further carries out the steps of:

synchronizing the configuration information in the shadow policy with changes made to the configuration information in the data protection policy.

13. A computer program product, comprising a non-transitory computer-readable medium having a computer-readable program code embodied therein, the computer-readable program code adapted to be executed by one or more processors to implement a method comprising:

receiving a plurality of assets to associate to a data protection policy;

receiving configuration information for the data protection policy, the configuration information comprising a data protection job to perform for the assets, and a schedule for the data protection job;

generating a shadow policy comprising the configuration information from the data protection policy, and a retry protocol;

performing the data protection job according to the schedule in the data protection policy;

detecting a failure of the data protection job for an asset associated with the data protection policy;

moving the asset out of the data protection policy and into the shadow policy;

retrying the data protection job for the asset according to the retry protocol in the shadow policy;

determining that a threshold number of retries has been reached without the data protection job having been successfully completed;

upon the determination, collecting a plurality of logs maintained by a plurality of services involved with the data protection job, the logs having recorded a set of events, timestamps when the events occurred, and severity levels for the events;

dividing a length of time over which the retries occurred into a plurality of time intervals;

forming a plurality of timeslots corresponding to the plurality of time intervals;

grouping the plurality of events into the plurality of timeslots based on the timestamps of when the events occurred;

generating a dataset by summing, for each particular timeslot and each particular severity level, a number of events that occurred in that particular timeslot and had that particular severity level;

applying k-means clustering to the dataset to generate first and second cluster sets;

identifying one of the first or second cluster sets as being a target log segment based on the one of the first or second cluster sets having a greater number of events with higher severity levels than another of the first or second cluster sets; and reporting, to a user, the target log segment.

14. The computer program product of claim 13 wherein the retrying the data protection job further comprises:

increasing, with each failed retry of the data protection job, a duration of a time interval after which the data protection job is retried.

15. The computer program product of claim 13 wherein the retrying the data protection job further comprises:

waiting for a wait time to elapse before retrying the data protection job, wherein the wait time comprises a random amount of time added to a base time.

16. The computer program product of claim 13 wherein the data protection policy and the shadow policy execute independently of each other.

17. The computer program product of claim 13 wherein the method further comprises:

when a retry of the data protection job for the asset has been successful, moving the asset out of the shadow policy and back into the data protection policy.

\* \* \* \* \*